United States Patent [19]

Brooks, Jr. et al.

[11] Patent Number: 4,853,811
[45] Date of Patent: Aug. 1, 1989

[54] MAGNETIC DISK DRIVE WITH LOW PROFILE HEAD-SUSPENSION SYSTEM

[75] Inventors: William W. Brooks, Jr., Oronoco, Minn.; Curtis J. Clemen, Sioux Falls, S. Dak.; Jerome T. Coffey, Oronoco, Minn.; Timothy P. Coffield, Boyne City, Mich.; David R. Larson, Byron, Minn.

[73] Assignee: International Business Machines Corporation, Armonk, N.Y.

[21] Appl. No.: 81,204

[22] Filed: Aug. 3, 1987

[51] Int. Cl.⁴ .......................... G11B 5/60; G11B 5/48
[52] U.S. Cl. ........................................ 360/103; 360/104
[58] Field of Search ................ 360/103, 104, 128, 105

[56] References Cited

U.S. PATENT DOCUMENTS

| | | | |
|---|---|---|---|
| 3,931,641 | 1/1976 | Watrous | 360/104 |
| 4,700,250 | 10/1987 | Kuriyama | 360/103 |
| 4,724,500 | 2/1988 | Dalziel | 360/103 |

FOREIGN PATENT DOCUMENTS

| | | | |
|---|---|---|---|
| 0218811 | 4/1987 | European Pat. Off. | 360/103 |
| 53-5610 | 1/1978 | Japan | |
| 56-117369 | 9/1981 | Japan | 360/103 |
| 57-17285 | 4/1982 | Japan | 360/103 |
| 57-191872 | 11/1982 | Japan | 360/103 |
| 61-110324 | 5/1986 | Japan | |
| 61-192081 | 8/1986 | Japan | 360/104 |
| 62-12917 | 1/1987 | Japan | 360/103 |

OTHER PUBLICATIONS

Suzuki et al., "High Density Magnetic Recording Heads for Disk", IEEE Trans. on Magnetics, vol. MAG-17, No. 6, Nov. 1981, pp. 2899–2901.

Primary Examiner—John H. Wolff
Assistant Examiner—Matthew J. Bussan
Attorney, Agent, or Firm—Robert W. Lahtinen

[57] ABSTRACT

The magnetic data storage system includes a magnetic transducer head-suspension assembly with an inline suspension slider with a reduced height leading portion that provides for gimballed connection to the suspension load beam and a full height rear portion that enables the use of the increased height portion for the transducer coil windings. The suspension includes a single piece combined gram form and load beam with the entire head-suspension assembly being contained within the height of the slider full height portion to enable minimization of the head-suspension overall height required in magnetic disk drives with closely spaced disks and back to back transducer heads or minimum height head-suspension assemblies that extend between disk surfaces.

18 Claims, 7 Drawing Sheets

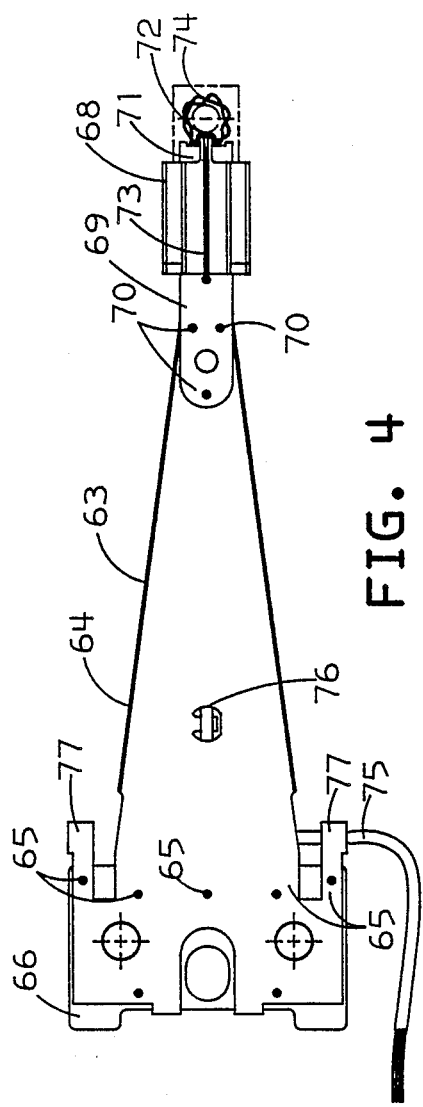
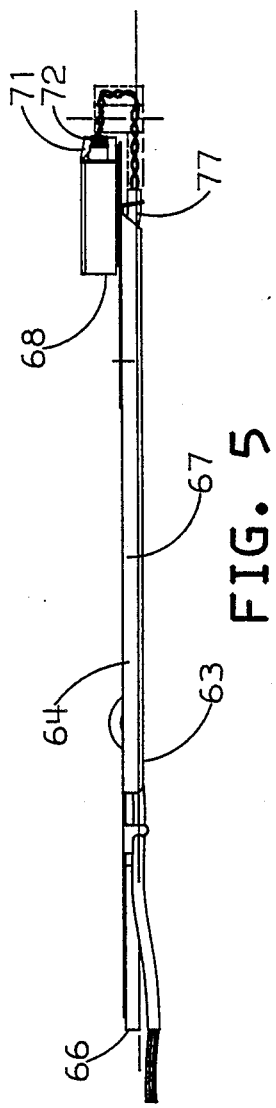
FIG. 4
FIG. 5

MAGNETIC DISK DRIVE WITH LOW PROFILE HEAD-SUSPENSION SYSTEM

FIELD OF THE INVENTION

This invention pertains to magnetic disk drives and more particularly to disk drives with low profile transducer head-suspension assemblies which cooperate with closely spaced magnetic disk storage media.

BACKGROUND OF THE INVENTION

The requirement for progressively higher magnetic disk drive storage capacities is met through the use of increased linear bit densities, increased track densities and by increasing the number of recording surfaces. The single constraint that remains unaltered is the overall size of the drive. The overall dimensions of the drive unit or the form factor is the standard that must be accommodated to make the drive a commercially acceptable product.

When two, three or four disks are used within the existing form factors, the existing head and suspension designs are adequate. As increased numbers of disks are used to achieve more disk surfaces within the same dimensions or form factor, the space between adjacent disks is reduced, making more difficult both the assembly and operation of the device. Two major problems arise, one is the height limitation and the other is the less than adequate dynamic response of existing suspension designs in the closely spaced disk environment. One way to accommodate close spacing between disk surfaces is to offset head assemblies rather than use back to back mounting so that in the side by side arrangement each head and associated suspension can utilize the full height separating adjacent disks. However, since when using a rotary actuator the object is to cause the arcuate path followed by the transducer to closely approach a chord positioned on a radius and also have the transducer axis through the transducer gap tangent to each track accessed, the use of a side by side mounting technique causes the actual paths of the transducers to deviate further from the idealized path. In addition, the use of a side by side configuration will result in a loss of storage capacity. Normally all the data surface is utilized from the outermost track at which the head will fly properly to the innermost track at which an acceptable signal can be generated at the reduced linear speed. In a side by side environment one head will not use tracks at the innermost diameter, while the other will sacrifice tracks at the outer diameter (which are the most valuable tracks). If the back to back head orientation is avoided by having the heads mounted at different radial distances from the actuator axis of rotation, a loss of storage capacity occurs since one head must operate at a much higher track density.

SUMMARY OF THE INVENTION

The head-suspension assembly is shown in the environment of an inline transducer suspension mounted on a rotary actuator. The slider has a full height portion to provide the maximum height for the coil and core portions of the transducer and a reduced height forward portion that accommodates the gimbal spring-load beam structure of the associated suspension without exceeding the vertical dimension of the full height portion. The window size in the core can thus receive 25 turns of 45 gauge bifilar wire and still achieve a slider height of less than 1.5 millimeters. The disclosed slider or head design as shown, in combination with a suspension contained within the height of the head allows the head-suspension assembly to obtain an overall height in an inline configuration of less than 1.5 millimeters. In an actual embodiment of the invention, the full height rear portion has a maximum height which does not exceed 1.4 millimeters and the reduced height forward portion has a height of 0.65 millimeters. This is a reduction of about 35% from the current state of the art designs. The reduced height portion also lowers the mass of the slider which raises the resonant frequencies of the head suspension system and moves such frequencies away from the lower frequencies generated by the mechanical elements of the file. The lower mass also improves access time, the reduced amount of ferrite reduces magnetic noise pickup and the head center of mass and the load point of the suspension are lowered, both of which contribute to increasing the dynamic stability of the head suspension assembly. Other magnetic properties of the head are not compromised by the reduced mass design and the heads can be manufactured using current processes and equipment.

The load beam, with a flexible gram form and a load carrying portion, is formed as a single part with the stiffened substantially rigid load carrying portion attached to the gimbal spring. The gimbal spring is connected to both the load beam and the slider to provide the support for the magnetic transducer as a part of the actuator assembly. The load carrying portion is afforded rigidity by turning the tapered margins to not only provide rigidity, but also create a lead channel to receive and support the snare through which passes the conductors from the transducer coil. The lead channels not only provide a convenient route to contain the head leads within a minimum height, but further protect the head leads against mechanical damage during manufacture and afford protection against electrical noise interference by providing a grounded three quarter enclosure along much of the lead length.

At the rear of the load beam, flexure is afforded by a flat portion of increasing width that has stiffness controlled by the material, thickness, length and the size of a central aperture which enhances lateral stiffness. The reduced length of this suspension design offers better space utilization in compact files. The high lateral stiffness allows high access rates without suspension windup or suspension roll of the slider. This attribute enables maximum acceleration during seek operations and minimizes settle time after reaching the desired track, both of which functions contribute to improved access time. File storage capacity is increased using the suspension since the lack of resonance of the suspension requires less disk area be used for crash stopping.

While the suspension design is shown in the environment of an inline transducer head suspension and optimized to a particular set of parameters, the performance advantages could also be used in an orthogonal head-suspension assembly. The technique could be extended by further shortening overall suspension length to increase resonant frequencies for optimum performance in a particular environment and the length and width of the formed area can be changed to tailor the stiffness to the required value. Constrained layer damping can be added to portions of the formed area and/or load beam to further enhance the dynamics of the design beyond what is possible with the all metal design shown. A viscoelastic material such as RTV silicone rubber can be applied to the load dimple for applications where extremely high accelerations without hysteresis are needed.

BRIEF DESCRIPTION OF THE DRAWING

FIGS. 4 and 5 are respectively bottom and side elevation views of a state of the art head-suspension assembly in an inline configuration.

DETAILED DESCRIPTION

Figure 1:
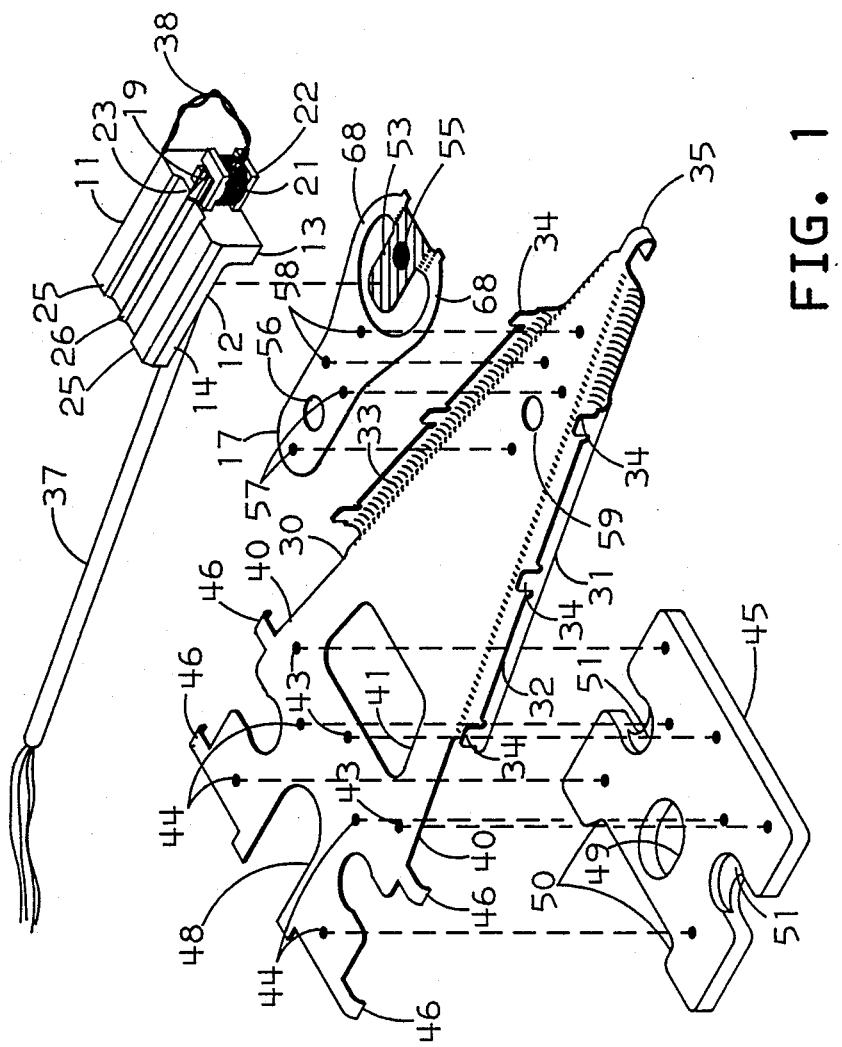
FIG. 1 is an exploded view of the head-suspension assembly of the present invention.
Figure 2:
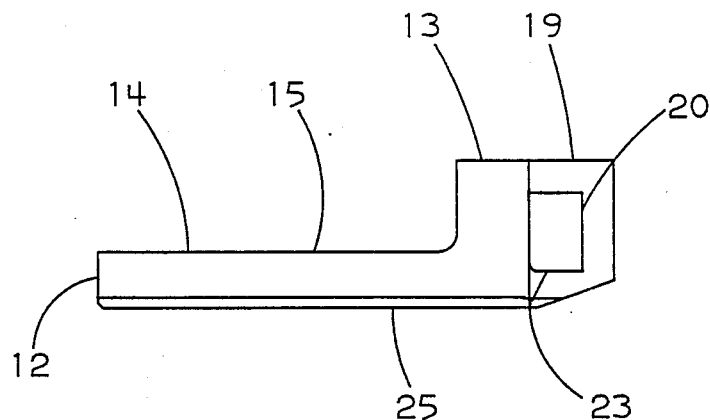
FIGS. 2 and 3 are respectively elevation and bottom views of the slider assembly of the invention.
Figure 3:
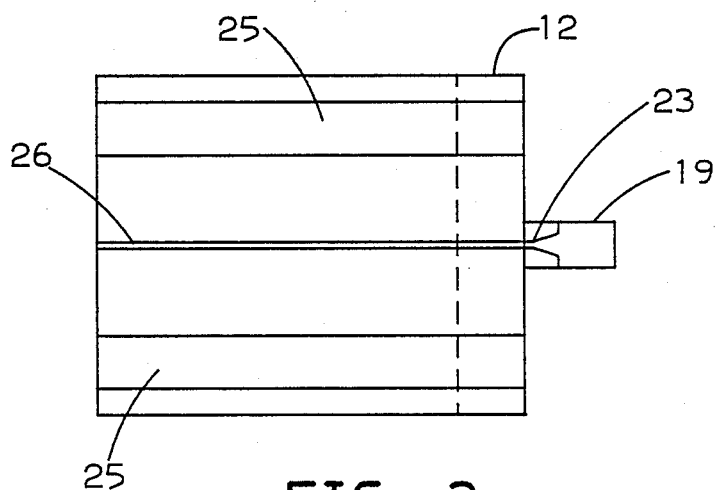

The head-suspension assembly is shown in the exploded view of FIG. 1. The head assembly includes a halfback slider 12 (also shown in FIGS. 2 and 3) which has a full height rear portion 13 and a reduced height forward portion 14 that presents a planar shelf 15 surface to which the gimbal 17 spring is bonded. The full height portion 13 of the slider includes the magnetic core portions including the C-core 19 that creates the window 20 through which the windings 21 are received about the bobbin 22. The C-core 19 is intimately bonded to the slider body at the upper side of the window 20 and is bonded by the glass filled gap 23 in the conventional manner to create a minimum length transducer gap immediately adjacent the magnetic media recording surface. The head is of the three rail type with the outer rails 25 presenting the principal air bearing surfaces that in the operative assembled condition support the head above the adjacent media. The read-write transducer gap is formed at the rear of the center rail 26.

The reduced height portion 14 extends well to the rear of the location axially overlying the center of the air bearing surface and the center of mass of the slider. The full height portion 13 accommodates the coil windings 21 and the reduced height portion enables the gimballed suspension to be connected without exceeding the full height dimension. With these constraints it is possible to design and manufacture a transducer head assembly less than 1.5 millimeters in height. The reduced height portion 14 is less than half the height of the full height portion 13 to create a low mass head. The reduced mass of the head raises the resonant frequencies of the head-suspension assembly and also improves the access time. The smaller quantity of ferrite in the head reduces the magnetic core noise pickup. The resonances of this reduced size and mass head-suspension system are at a frequency above the file resonances to enable superior dynamic performance in a fast access magnetic disk storage system.

The gram form and load carrying elements of the load beam are formed as a single part 30 from resilient metal sheet material. Along the tapered forward portion the margins 31 are debossed and turned upward to form channels 32,33 and channel crimp tabs 34 with the distal end terminating in an outboard crimp tab 35. Thus the forward portion is not only stiffened or rigidified by the formed channels 32,33 and the working of the metal, but in addition receives the snare 37 which encloses the leads 38 from the transducer coil windings 21. The snare 37 is retained by the crimp tabs 34,35. The channel 32 or 33, in addition to providing mechanical protection, affords a grounded electrical shield which approximately three quarters surrounds the snare 37 throughout a substantial portion of its length. The symmetrical channel structures 32,33 at each side permit a common part to be used for both upwardly and downwardly facing transducer head assemblies.

The gram form portion of the suspension is in the form of two legs 40 separated by a window opening 41 and with a longitudinal extent from the rear of the channels 32,33 to the laser weld locations 43 which attach the flexure to the mounting plate 45. The permanent set applied by bending the gram form legs 40 determines the gram load force which urges the slider toward the confronting media surface A total of seven laser welds 43,44 secure the load beam 30 to mounting plate 45. Additional crimp tabs 46 are used to position and secure the snare 37 as it reaches the actuator arm beyond the flexure portion of the suspension.

The rearward opening 48 in the load beam 30 and the tooling slot 49 in the mount plate 45 serve to correctly align the parts during fabrication of the suspension assembly. Mount plate 45 is also provided with an orientation feature 50 for use when automatically attaching the load beam to the mount plate 45. The weld pockets 51 are of reduced material thickness to provide the welding sites for attachment of the head-suspension assembly to the actuator arm.

A gimbal spring 17 serves to connect the transducer head 11 to the load beam 30 and is designed to accommodate pitch and roll movements of the transducer head 11. Gimbal spring 17 is formed of a single piece of resilient sheet metal material and is coplanar except for the raised tab portion 53 that is bonded to the shelf surface or upper surface 15 of the slider 12 reduced height portion 14. A load dome 55 is a substantially spherical debossment that extends to the lower surface of the coplanar portion. The gimbal spring 17 is laser welded at four locations 57 to the load beam portion of the load beam member 30. Tooling holes 58,59 assist in aligning the load beam-flexure 30 and gimbal spring 17 during the welding of the parts to one another. During operation of the drive, load dome 55 maintains essentially point contact with the load beam surface while the curved flexure portions 68 of gimbal spring 17 permit the pitch and roll motions of the head 11.

FIGS. 4 and 5 illustrate a state of the art head-suspension assembly 63 in an inline configuration with a single load path that is advantageous in minimizing the number of resonances in the servo bandwidths to allow faster access times and more stringent servo control. The load beam-flexure 64 is welded at locations 65 to a mounting plate 66. The load beam portion is stiffened by marginal flanges 67 and a flat back slider 68 is bonded to gimbal spring 69 which is welded to the load beam portion at locations 70. The magnetic transducer gap 71 is formed using a C-core 72 at the trailing edge of the center rail 73. The transducer coil leads 74 pass through a snare 75 that is retained along the center of the lower surface of the load beam portion (as seen in FIG. 4) and is retained by crimp tabs 76 and pickle forks 77.

Figure 6:
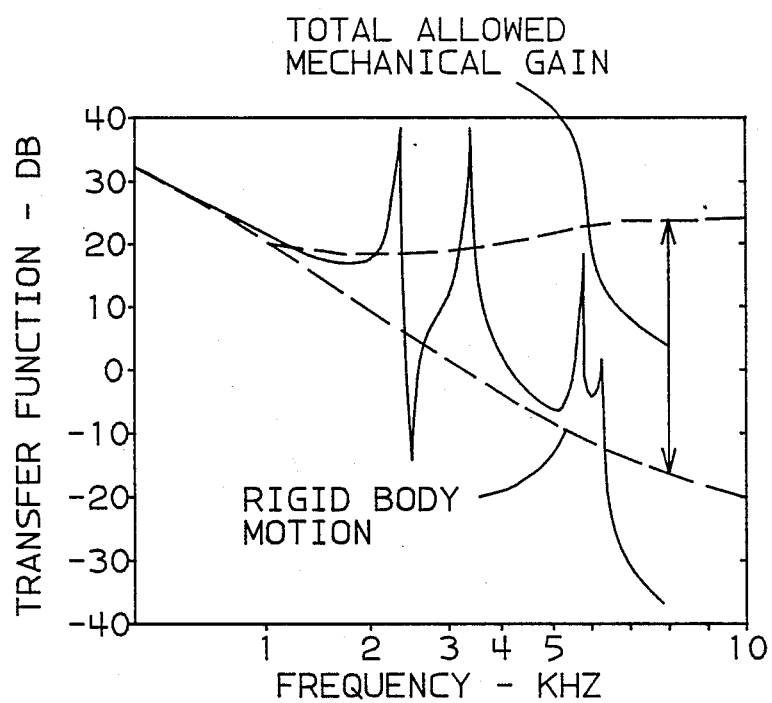
FIG. 6 is a graph showing resonance gain of the head-suspension of FIGS. 4 and 5 due to lateral input.

The graph of FIG. 6 shows a typical mechanical gain of the head-suspension assembly of FIGS. 4 and 5 that has been experimentally determined. In particular there are resonance conditions at about the 2 to 2.5 KHZ frequencies that exceed acceptable values. It would be necessary to suppress these resonance conditions by the use of added damping material or other damping techniques. Such alternatives would not only add cost, but would introduce an additional source of particulate material into the ultraclean environment of the head-disk enclosure.

Figure 7:
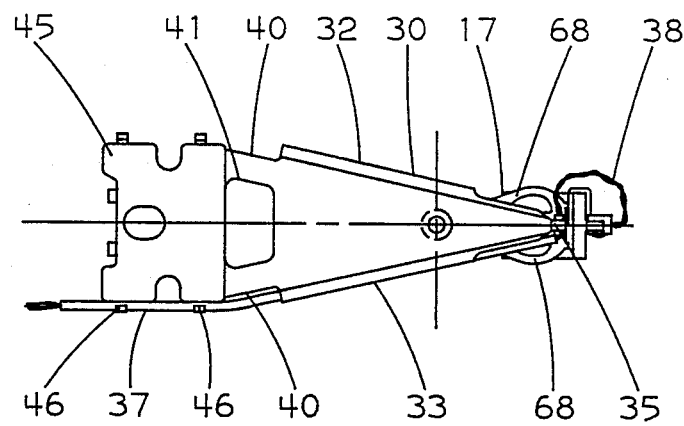
FIGS. 7 and 8 are respectively plan and side elevation views of the head-suspension assembly of the present invention.
Figure 8:
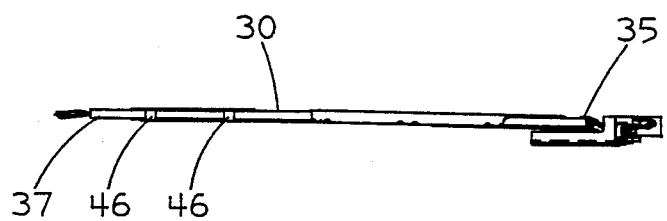

FIGS. 7 and 8 show the head-suspension assembly of FIG. 1 in assembled form. The plan view of FIG. 7 shows the load beam-flexure 30 welded to mount block 45 and the gimbal spring 17 which is welded to the load beam portion and bonded to the halfback slider 12. The coil leads 38 pass through the tubular snare 37, with the snare being retained by the terminal crimp tab 35, the channel crimp tabs which are not visible and the crimp tabs 46 formed in the load beam and adjoining mount block 45.

Figure 9:
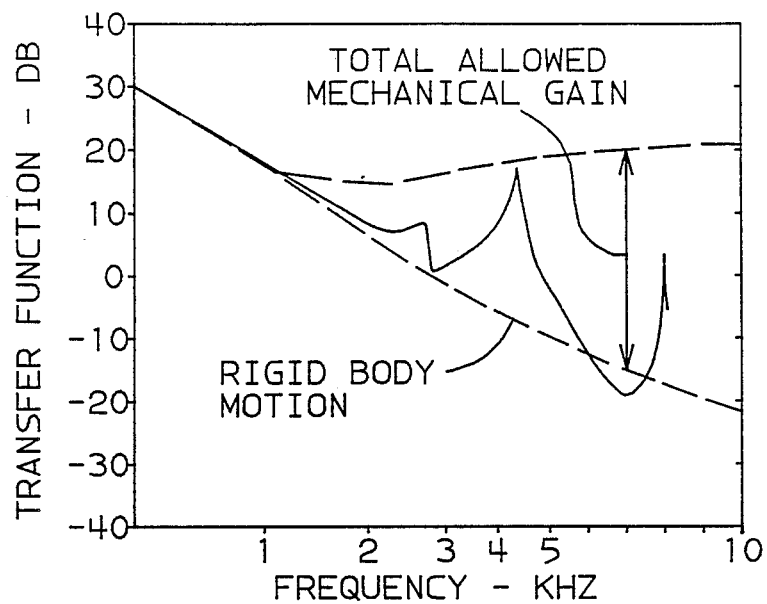
FIG. 9 is a graph, similar to that of FIG. 6, showing the resonance gain of the head-suspension assembly of FIGS. 7 and 8.

As compared to the design of FIGS. 4 and 5, this head-suspension has a shorter length and lower mass elements which in conjunction with the head and flexure configurations increase the resonance frequencies. FIG. 9 illustrates a transfer function that has been achieved using the design of FIGS. 7 and 8. The mechanical gain is constrained within allowed limits such that the transfer function shows no severe resonance conditions at the lower frequencies that would require additional damping materials. The frequency increase of the conditions of resonance allows more servo bandwidth and increased file storage capacity. The head-suspension of FIGS. 7 and 8, using the flexure legs 40 and intervening window 41 maintains a higher lateral stiffness to enable higher access rates by tolerating maximum initial acceleration and having a shorter settle time at the addressed track location.

Figure 10:
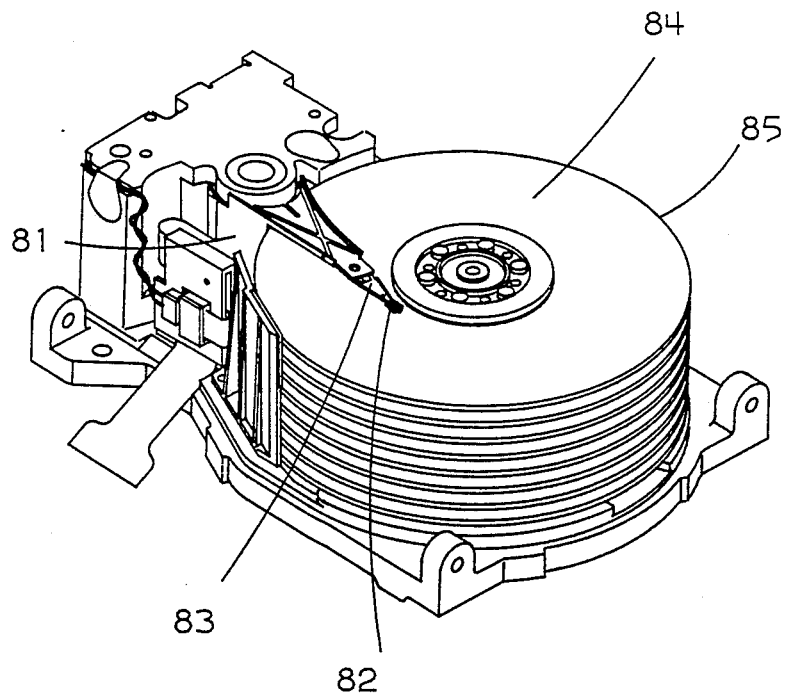
FIG. 10 is an isometric view of a disk drive with the cover removed and using the present head-suspension assemblies in conjunction with a rotary actuator and an eight disk spindle assembly.

FIG. 10 shows a disk file with the head-disk assembly cover removed and a rotary actuator 81 that supports and moves transducer heads 82 from one concentric data track to another using inline suspensions 83. The spindle assembly 84 includes eight magnetic storage disks 85.

The present head-suspension design provides a maximum overall height that does not exceed the full height portion of the transducer head by using a halfback slider design that enables the suspension to attach to the upper surface or shelf of the reduced height portion of the halfback slider. This overcomes the space constraints dictated by closely spaced disks. In addition the design enhances the lateral stiffness of the suspension, both factors improving the dynamic response of the system.

The advantages of the present head-suspension assembly are obtained using an all metal suspension without increasing manufacturing cost or requiring new or more expensive manufacturing techniques or equipment. The head-suspension assembly design as shown and described makes possible a profile height of less than 1.5 millimeters while increasing resonance frequencies above file resonance frequencies and achieving superior dynamic performance in a fast access device. Further, these benefits have been achieved without impairing or compromising other magnetic or mechanical properties of the head or suspension. Although shown and described in the environment of an inline suspension where the suspension extend generally tangentially with respect to the data track of interest, the invention could also be utilized to obtain the advantages in an orthogonal suspension.

While this invention has been particularly described with reference to a preferred embodiment thereof, it will be understood by those skilled in the art that various changes in detail may be made therein without departing from the spirit and scope of the invention.

What is claimed is:

1. A magnetic transducer assembly for writing data to and reading data from a magnetic recording media surface during relative movement between the transducer assembly and the magnetic media surface, said assembly comprising a magnetic slider according a single piece body portion presenting an air bearing surface means along the surface the confronts the media for supporting said slider in closely confronting relation to said media surface;

said slider including a front portion or leading edge at the end which first approaches surface portions of said media during relative motion between media and slider when reading or writing data and a rear portion or trailing edge which is opposite said front portion or leading edge and is the final portion of the slider to confront the associated media surface during relative motion between slider and media when reading or writing data;

said slider body having a full height portion disposed to the rear of the vertical axis through the center of area of said air bearing surface and a reduced height portion extending from said full height portion to the leading edge of said slider body; and a magnetic core cooperating with said full height portion and forming a transducing gap adjacent the trailing edge of said slider body portion.

2. The magnetic transducer assembly of claim 1, wherein the lower portion of said slider body includes three parallel rails with the outer rails presenting the principal air bearing surfaces and the center rail including a transducer gap substantially coplanar with the bottom surface of such center rail.

3. The magnetic transducer assembly of claim 1, further comprising a gimbal spring having a first surface portion secured to the upper surface of said slider body reduced height portion and a load beam that engages said gimbal spring to permit pitch and roll movement of said slider.

4. The magnetic transducer assembly of claim 3 wherein the gimbal spring and load beam portions overlying said slider do not project above the uppermost portion of said full height portion and said slider, load beam and gimbal spring are symmetrical about a common plane perpendicular to said load beam.

5. The magnetic transducer assembly of claim 3 wherein said load beam is a combined flexure and load beam member with a forward rigidified load beam portion and a rearward flexure portion which permits movement of said slider toward and away from the surface of said media; said slider, said load beam and said gimbal spring being symmetrical about a common plane.

6. The magnetic transducer assembly of claim 5 wherein said combined load beam and flexure member is formed as a single piece of resilient metal with the load beam portion being rigidified by debossed and turned flanged margins extending along the load portion of said member.

7. The magnetic transducer assembly of claim 6 wherein said flanged margins of said combined load beam and flexure member form channels in which leads from a transducer coil associated with said transducer gap may be received.

8. The magnetic transducer assembly of claim 3 wherein said combined load beam and flexure portion comprises a pair of legs that extend from said load beam portion and are separated by an aperture and said load beam portion extending said flexure portion is formed by debossing and turning the margins to form channels.

9. A magnetic transducer assembly for data transfer with respect to a magnetic recording media surface during relative movement between the transducer and the magnetic media surface, said assembly comprising a magnetic slider presenting a fluid bearing surface means for supporting said slider on a film of fluid in a closely confronting data transfer relation with respect to said magnetic recording media surface, said slider including a front portion or leading edge at the end which first approaches surface portions of said media during relative motion between media and slider when reading or writing data and a rear portion or trailing edge which is opposite said front portion or leading edge and is the final portion of the slider to confront the associated media surface during relative motion between slider and media when reading or writing data, said slider being formed of a single piece having a first rear full height portion which has the transducer gap at the trailing edge and supports the transducer core and the transducer coiling windings, and said slider having a reduced height second portion extending from said full height portion to the leading edge of said slider.

10. The magnetic transducer assembly of claim 9 wherein the upper surface of said slider second portion extends above the center of mass of said slider.

11. The magnetic transducer assembly of claim 10 wherein the height of said slider reduced height second portion does not exceed one half the height of said slider first rear portion.

12. The magnetic transducer assembly of claim 11 and further comprising a suspension assembly including a gimbal spring secured to the upper surface of said slider reduced height second portion to accommodate pitch and roll motions of said slider, and a load beam connected to said gimbal spring, said gimbal spring and said load beam portions which overlie said slider second portion not projecting above said slider portion first portion, with said slider, said load beam and said gimbal spring being symmetrical about a common plane.

13. A magnetic data storage system including head-suspension apparatus having a transducer carrying means and a bearing surface for maintaining the head in closely confronting relation with the surface of a magnetic media and actuator means for moving the head from one concentric track to another concentric track on said media comprising a rotating magnetic media, and a single piece slider presenting a fluid bearing surface for supporting said slider on a film of fluid in closely confronting data transfer relation to the recording surface of said rotating magnetic media, said slider including a front portion or leading edge at the end which first approaches surface portions of said media during relative motion between media and slider when reading or writing data and a rear portion or trailing edge which is opposite said front portion or leading edge and is the final portion of the slider to confront the associated media surface during relative motion between slider and media when reading or writing data, said slider having a first full height rear portion that supports the transducer core and the transducer coil windings at the trailing edge of said slider, said slider having a second reduced height portion extending from said rear portion to the front surface of said slider.

14. The magnetic data storage system of claim 13 wherein the upper surface of said slider reduced height second portion extends above the center of mass and the geographic center of the area of said fluid bearing surface of said slider.

15. The magnetic data storage system of claim 14 wherein the height of said slider reduced height second portion does not exceed one half the height of said first full height rear portion.

16. The magnetic data storage system of claim 15 and further comprising a gimbal spring secured to the upper surface of said slider reduced height second portion to accommodate pitch and roll motions of said slider, and a load beam secured at one end to said gimbal spring and at the end opposite said one end to the actuator means, said gimbal spring and said load beam portions which overlie said slider second portion not extending above the upper surface of said slider first portion.

17. The magnetic data storage system of claim 16 wherein said load beam includes debossed and turned margins which rigidify a portion of said load beam and are adapted to receive the lead wires from said transducer coil windings to provide mechanical protection and shielding for said wires.

18. The magnetic data storage system of claim 17 wherein said slider, said gimbal spring and said load beam are symmetrical about a plane perpendicular to said load beam.

* * * * *

UNITED STATES PATENT AND TRADEMARK OFFICE
CERTIFICATE OF CORRECTION

PATENT NO. : 4,853,811

DATED : Aug. 1, 1989

INVENTOR(S) : W. W. Brooks Jr., C. J. Clemens, J. T. Coffey, T. P. Coffield, and D. R. Larson It is certified that error appears in the above-identified patent and that said Letters Patent is hereby corrected as shown below:

IN THE CLAIMS:

Claim 1, Col. 6, Line 16, delete "according" and insert therefor --including--.

Claim 1, Col. 6, Line 18, delete "the"(second occurrence) and insert therefor -- that -- .

Claim 8, Col. 7, Line 9, after the word "flexure", insert --member flexure--.

Claim 9, Col. 7, Line 20, delete "a".

Claim 9, Col. 7, Line 34, delete "coiling" and insert therefor -- coil -- .

Signed and Sealed this

Twelfth Day of June, 1990

Attest:

HARRY F. MANBECK, JR.

*Attesting Officer*        *Commissioner of Patents and Trademarks*